United States Patent Office 3,053,486
Patented Sept. 11, 1962

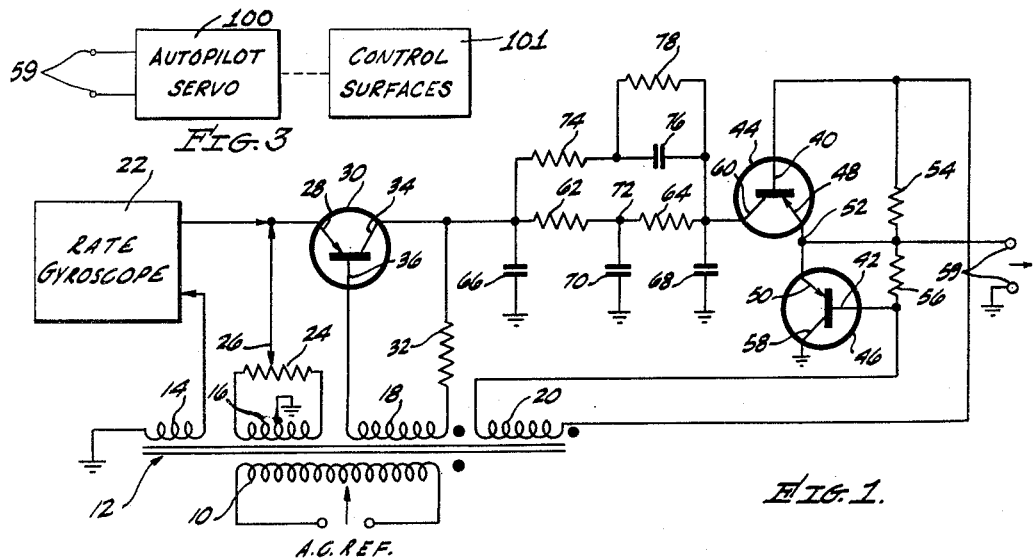
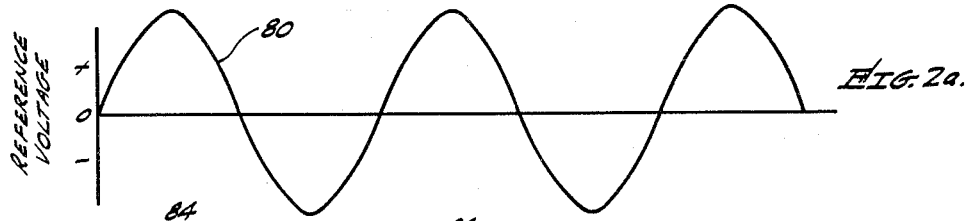
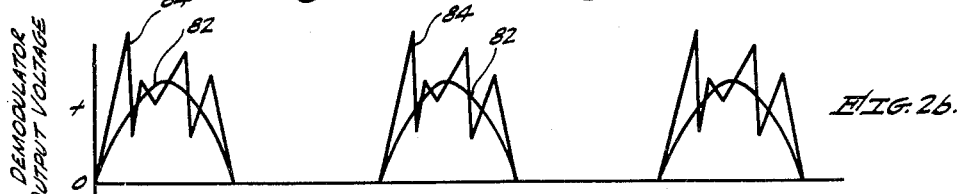
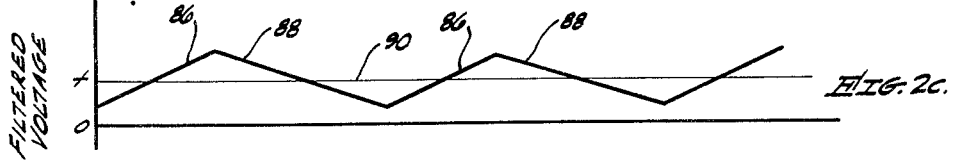
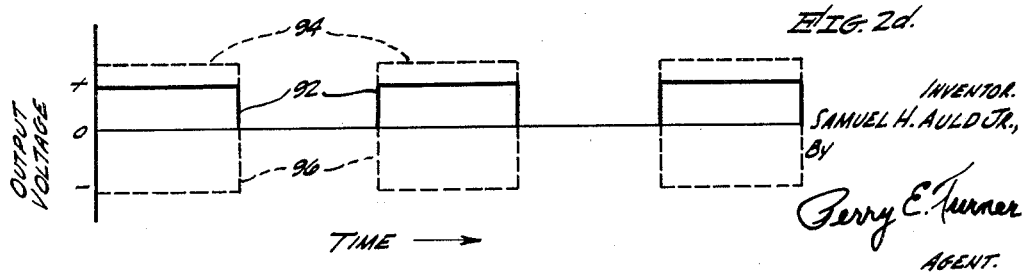

3,053,486
CIRCUIT FOR INTEGRATING, DIFFERENTIATING AND THE LIKE
Samuel H. Auld, Jr., Canoga Park, Calif., assignor to Lear, Incorporated
Filed Aug. 27, 1957, Ser. No. 680,523
9 Claims. (Cl. 244—77)

This invention relates to circuits for deriving an output signal having predetermined mathematical functional relations to an input signal, and more particularly to improved circuit means for performing integration, differentiation and the like, and which is suitable, for example, for use in stabilizing an aircraft about an axis in space in response to the output of a rate gyroscope.

As is well known, many autopilots employ a rate gyroscope and a displacement (vertical) gyroscope to provide signals for use in stabilizing an aircraft about an axis in space, and an angular accelerometer may be employed to sense angular acceleration or deceleration of the aircraft about such axis. Also, rate gyroscopes employed in such autopilots are damped, because undamped gyroscopes are objectionable in that their output voltages contain, in addition to velocity signals, unwanted components due to such factors as bearing noise, vibration of the gyroscope motor at its resonant frequency, and propeller and engine vibrations. A damped gyroscope wherein these defects are minimized requires numerous structural refinements, and the end product is quite expensive.

It is an object of this invention to provide improved means for integrating, differentiating and the like, in response to the output of a single source of signals.

It is another object of this invention to provide electronic means to extract signals from a source wherein the output may be full of noise, and in which the effects of the noise are substantially eliminated.

It is a further object of this invention to provide aircraft stabilization means in which signals for controlling the aircraft about an axis in space are all derived from a single rate gyroscope.

Still another object of this invention is to provide electronic means employing transistors to detect the angular velocity of an aircraft about an axis in space, to develop from the signals detected the first time derivative and first time integral thereof, and to utilize these in the proper proportions to permit the aircraft to be stabilized about such axis.

It is also an object of this invention to provide simple electronic means useful in conjunction with an undamped rate gyroscope to develope data normally obtainable only by the use of the combination of a damped rate gyroscope and a displacement gyroscope.

The above and other objects and advantages of this invention will become apparent from the following description, taken in conjunction with the accompanying drawing, in which a preferred embodiment is illustrated by way of example. The scope of the invention is pointed out in the appended claims. In the drawing, FIG. 1 is a schematic diagram of an electronic network for deriving signal indications from a single rate gyroscope which represent velocity, displacement and acceleration of an aircraft about an axis in space, in accordance with this invention;

FIGS. 2a–2d illustrate wave forms to aid in explaining the operation of the circuit of FIG. 1; and FIG. 3 is a block diagram showing the relation between the circuit of FIG. 1 and the aircraft autopilot servo.

Briefly, in accordance with this invention, the cyclical output of a signal source is demodulated to provide a pulsating D.-C. voltage. Such D.-C. voltage is simultaneously filtered, integrated and differentiated, and a composite smooth D.-C. voltage derived. A modulator is employed to convert the smooth D.-C. voltage to an alternating voltage. To insure that the alternating voltage thus derived is free of components representing noise, a trim voltage is utilized which is of magnitude and phase to nullify the noise components.

Referring to FIG. 1, an A.-C. reference voltage is applied to the primary winding 10 of the transformer 12 having four secondary windings 14, 16, 18 and 20. One secondary winding 14 is arranged to energize a rate gyroscope 22. Secondary winding 16 is provided with a center-tap connection to a point of reference or ground potential, and a potentiometer 24 is connected across the ends of secondary winding 16, with the sliding contact 26 thereof being connected with the signal output from gyroscope 22 to the emitter electrode 28 of a transistor 30. Secondary winding 18 and a current limiting resistor 32 are connected in series between the collector electrode 34 and base electrode 36 of transistor 30. Secondary winding 20 has it ends connected to the base electrodes 40, 42 of respective transistors 44, 46. The emitter electrodes 48, 50 of transistors 44, 46 have a common junction point 52, and respective current limiting resistors 54, 56 are connected between junction point 52 and base electrodes 40, 42. The collector electrode 58 of transistor 46 is connected to ground. Junction 52 is connected to output terminals 59, which in turn are connected to the input of servo amplifier 100 which drives control surfaces 101 of the aircraft, as shown in FIG. 3. If desired, the emitter and collector connections shown for the various transistors may be reversed. Further, although p-n-p junction transistors are shown it will be understood that n-p-n junction transistors may also be employed in which case the potentials dealt with are reversed.

The collector electrodes 34 and 60 of respective transistors 30, 44 are connected through a pair of series resistors 62, 64. Respective capacitors 66 and 68 are connected between collector electrodes 34 and 60 to ground, and a capacitor 70 is connected between the junction 72 of resistors 62 and 64 to ground. Shunting resistors 62, 64 are a resistor 74 and capacitor 76 connected in series, and capacitor 76 is shunted by a resistor 78.

In describing the operation of the circuit of FIG. 1, reference will be made to FIGS. 2a–2d along with FIG. 1. FIG. 2a illustrates the reference voltage 80 as sinusoidal, and this voltage is preferably in phase with the signal output from rate gyroscope 22. By virtue of the arrangement of secondary windings 18, 20, and the various emitter-base connections, transistors 30, 44 are rendered alternately conducting; also, transistor 46 is rendered alternately conducting with transistor 44. For example, transistors 30 and 46 are simultaneously conducting during the positive half-cycles of the reference voltage 80, and transistor 44 conducts during the negative half-cycles.

In FIG. 2b, the D.-C. voltage pulsating waveforms 82 illustrate the signal portion of the output of rate gyroscope 22 which appears on collector 34 during conduction of transistor 30. Irregular shaped waveforms 84 illustrate noise components accompanying the signal, such noise resulting from the various factors previously mentioned. Capacitor 66 provides filtering action, being charged as indicated at 86 (FIG. 2c) during conduction of transistor 30 and discharged as indicated at 88 during non-conduction of transistor 30.

Resistors 62, 64 and capacitor 70 constitute an integrator, the time constant of which is designed to be long enough so that it can detect normal course deviations of the aircraft occasioned by aerodynamic forces; this function will be more fully explained hereinafter.

Resistor 74, and capacitor 76 together form a differentiator, resistor 74 being somewhat large compared to resistors 62 and 64. Resistor 78, which is large with respect to resistors 62 and 64, and which preferably is large compared to resistor 74, forms with resistor 74 a direct path between collectors 34 and 60 of transistors 30, 44. Finally, capacitor 68 forms an additional filter device which insures that any voltage appearing on collector 34 will be converted to a substantially smooth D.-C. voltage 90 at the collector 60 of transistor 44 when it is rendered conducting. When transistor 44 is rendered conducting, voltage 90 appears on emitter 48 to be passed to the output terminals 59. During the succeeding half-cycle when transistor 44 is non-conducting and transistor 46 is conducting, junction 52 is effectively connected to ground, whereby a pulsating D.-C. voltage 92 appears at the output terminals 59 and is effectively referenced to ground. Such voltage may readily be converted to an alternating voltage, as by capacitive means in the output. Thus, the arrangement of transistors 44, 46 forms a half-wave modulator. Other modulators (half-wave or full-wave) may be employed, however. Of course, a full-wave modulator will give an alternating output of twice the peak-to-peak amplitude of the half-wave modulator.

To render the system substantially noise-free, and to illustrate the effectiveness of the invention in this regard, assume that noise voltage 84 is of greater magnitude than the signal component in the output of rate gyroscope 22. Stated otherwise, if noise voltage 84 were passed through the system itself, it would result in an output voltage, indicated at 94 in FIG. 2d, which is larger than the voltage 92 derived from the signal component. To null out such noise in the output, the sliding contact 26 of the potentiometer 24 is adjusted, in the absence of any signal in the output of the rate gyroscope 22, until the output voltage across terminals 91 reduces to zero, i.e., until the output voltage (96 in FIG. 2d) due to the positioning of sliding contact 26 is equal and opposite to the voltage 94 due to noise. Thereafter, output voltages appearing across the output terminals accurately represent signal data.

Secondary winding 16 and potentiometer 24 thus provide an effective trim arrangement. However, it should be noted in this regard that the sliding contact 26 can be connected to other parts of the circuit to accomplish the same trimming effect. For example, sliding contacts could be connected to the collector electrode 60 of transistor 44, or in fact to junction 52; if connected to the junction 52, however, suitable smoothing means (not shown) should be employed to maintain the desired square shaped output voltage.

Since unidirectional voltages 82 represent the signal output of gyroscope 22, they of course represent angular velocity of the aircraft about one of its axes. Thus, the portion of the D.-C. signal fed through resistors 74, 78 is a signal representing such angular velocity. Integrator 62—70—64 derives a first time integral signal, whereby angular displacement is represented by the portion of the signal fed through the integrator. And if the aircraft is turning at a constant rate, D.-C. voltage 90 and output signal 92 represent only these two factors. However, if the aircraft is accelerating or decelerating about the axis in question, such would be represented by a portion of D.-C. signal 90 and output signal 92, because differentiator 74—76 provides the first time derivative of the velocity signal 82.

In order to control the aircraft, signals appearing across the output terminals are applied to control surface actuating means. Such means, e.g., means to control the rudder, are well known in the art; they form no part of this invention, and hence will not be treated here. However, and as is well known, since one signal is used for control purposes, the portions representing angular displacement, angular velocity and angular acceleration must be present in proper proportions for coordinated flight control of the particular aircraft. Therefore, the values of the resistors and capacitors are selected to insure the necessary proportionality. However, it will be apparent that variable resistors and capacitors may be employed, whereby the same circuit components are used for different aircraft, but which are adjusted to insure the necessary proportionality to stabilize the individual aircraft.

It will be seen that this invention develops data for stabilizing an aircraft relative to an axis (roll, pitch or yaw) from a single undamped rate gyroscope, in contrast to combinations of displacement (vertical) gyroscopes, damped rate gyroscopes, and accelerometers.

It will also be apparent that rate gyroscope 22 represents only one type of source of cyclical signals upon which the circuit of this invention may operate; the source may be any type developing a cyclical output signal for which the first time integral or derivative is desired. Further, integration and differentiation do not have to be used together, i.e., only first time integral or first time derivative signals may be desired, in which case only the appropirate circuit means (integrator or differentiator) need be employed.

What is claimed is:

1. Means for stabilizing a craft about an axis in space comprising a rate gyroscope producing first, second, and third signals proportional to the angular velocity of said craft about said axis, electronic means receiving said first signal and producing a fourth signal proportional to the first time derivative with respect to said first signal, second electronic means receiving said second signal and producing a fifth signal proportional to the first time integral with respect to said second signal, means combining said third, fourth, and fifth signals in predetermined proportions, and means responsive to the combined signal for controlling the craft to maintain said combined signal at zero.

2. In combination, a source of cyclical signals representing an angular velocity about a predetermined axis, transistor means having an emitter-collector path and a base electrode, means connected between said current path and said base electrode to render said transistor means alternately conducting and non-conducting during predetermined half cycles of said cyclical signal, whereby corresponding half cycles of the cyclical signal appear in said current path as D.-C. voltages, means for filtering the D.-C. voltages, a modulator, a three-path network connected between said filter means and said modulator, one path of said network forming a resistive connection between said filter means and said modulator, a second path of said network forming a differentiator, the third path forming an integrator, thereby to provide a D.-C. signal at the input of said modulator which includes respective portions representing an angular velocity, angular acceleration, and angular displacement about the predetermined axis, and said modulator responding to said D.-C. signal to develop a square wave output voltage.

3. A combination in accordance with claim 2, further including a source of reference voltage of the frequency of said cyclical signal, and means to apply said reference voltage to a predetermined point intermediate the source output and the output of said modulator to prevent unwanted components in the output of the source from appearing in the output of said modulator.

4. A combination in accordance with claim 2, wherein said source is an undamped rate gyroscope, whereby the cyclical signal from the gyroscope contains components representing noise, a source of cyclical voltage of the frequency of the cyclical signal from the rate gyroscope, and means to apply said cyclical voltage to a predetermined point between the output of the rate gyroscope and the output of said modulator in such phase and magnitude that the effect of the noise components in the output of said modulator is reduced to zero.

5. In an aircraft having an axis about which it may be subject to displacement, velocity, and acceleration or deceleration, including autopilot means to control the aircraft relative to such axis, and wherein the autopilot means requires for such control a signal which includes data representing angular velocity, angular displacement and angular acceleration or deceleration of the aircraft about such axis, the combination of a rate gyroscope which develops cyclical signals of a predetermined frequency representing the angular velocity of the aircraft about such axis, means for converting said cyclical signals to unidirectional voltage fluctuations, first and second filter means for filtering said voltage fluctuations, respective integrator, differentiator and resistive means connected between said first and second filter means, said second filter means responding to voltages from said integrator, differentiator, and resistor means to establish a substantially smooth composite D.-C. voltage, portions of said D.-C. voltage from said resistive and integrator means representing respectively the angular velocity, angular displacement of the aircraft about such axis, said D.-C. voltage containing a portion from said differentiator means which represents acceleration or deceleration depending upon whether the aircraft is undergoing angular acceleration or angular deceleration relative to such axis, and means coupled to said second filter means to develop from said D.-C. voltage a square wave output voltage.

6. A combination in accordance with claim 5, wherein the converting means includes a transistor having emitter, collector and base electrodes, a source of cyclical reference voltage, one of said emitter and collector electrodes being coupled to the source of rate of change of displacement signals, and means coupling said source of cyclical reference voltage between said base electrode and the other of said emitter and collector electrodes to effect emitter-collector current flow through said transistor during alternate half cycles of the cyclical signal.

7. A combination in accordance with claim 5, wherein the angular velocity signals from the rate gyroscope include components representing noise and the converting means includes a transistor having emitter, collector, and base electrodes, and means coupled between one of said emitter and collector electrodes and said source of cyclical reference voltage to apply the reference voltage to said one electrode of such phase and magnitude as will prevent the noise components from affecting the output voltage.

8. A combination in accordance with claim 5, wherein said integrator means includes a pair of equal resistors connected in series between said first and second filter means and a capacitor connected between the junction of said resistors and a point of reference potential, said differentiator means includes a resistor and capacitor connected in series between said first and second filter means, said resistive means includes a resistor of said differentiator means and a further resistor shunting the capacitor of said differentiator means, the resistor of said differentiator means being large compared to either of the resistors of said integrator means, and the resistor shunting the capacitor of said differentiator means being large compared to the resistor of said differentiator means.

9. A combination in accordance with claim 5, wherein the means for developing a square wave output voltage includes first and second transistors each having an emitter-collector current path and a base electrode, a common junction between said emitter-collector current paths, the emitter-collector current path of said first transistor being connected between said second filter means and said common junction, the emitter-collector current path of said second transistor being connected between said common junction and a point of reference potential, and means coupled to the base electrodes of said first and second transistors to render them alternately conducting to alternately connect said common junction to said filter means and said point of reference potential.

References Cited in the file of this patent

UNITED STATES PATENTS

| | | |
|---|---|---|
| 2,511,846 | Halpert | June 20, 1950 |
| 2,649,563 | Meredith | Aug. 18, 1953 |
| 2,766,627 | Lower et al. | Oct. 16, 1956 |
| 2,769,132 | Jarvis | Oct. 30, 1956 |
| 2,776,428 | Hassler et al. | Jan. 1, 1957 |
| 2,899,828 | Lynn | Aug. 18, 1959 |